(12) United States Patent
Claes et al.

(10) Patent No.: US 10,732,010 B2
(45) Date of Patent: Aug. 4, 2020

(54) SANITARY APPLIANCE AND METHOD OF DETERMINING USE THEREOF

(71) Applicant: IPEE NV, Wilrijk (BE)

(72) Inventors: Victor Claes, Berchem (BE); Bart Geraets, Edegem (BE); Werner Dupont, Wilrijk (BE)

(73) Assignee: IPEE NV, Wilrijk (BE)

( * ) Notice: Subject to any disclaimer, the term of this patent is extended or adjusted under 35 U.S.C. 154(b) by 156 days.

(21) Appl. No.: 14/443,055

(22) PCT Filed: Nov. 18, 2013

(86) PCT No.: PCT/EP2013/074090
§ 371 (c)(1),
(2) Date: May 14, 2015

(87) PCT Pub. No.: WO2014/076284
PCT Pub. Date: May 22, 2014

(65) Prior Publication Data
US 2015/0292912 A1 Oct. 15, 2015

(30) Foreign Application Priority Data
Nov. 16, 2012 (NL) ...................................... 2009825

(51) Int. Cl.
*E03D 5/10* (2006.01)
*G01D 5/24* (2006.01)

(52) U.S. Cl.
CPC ............... *G01D 5/24* (2013.01); *E03D 5/105* (2013.01)

(58) Field of Classification Search
CPC ....... E03C 1/057; E03D 13/00; E03D 13/105; E03D 5/10; E03D 5/105; A61B 5/14507; A61B 5/207–208

(Continued)

(56) References Cited

U.S. PATENT DOCUMENTS 3,368,225 A * 2/1968 Saburo ...................... E03D 5/10
4/249
3,462,769 A 8/1969 Ichimori et al.
(Continued)

FOREIGN PATENT DOCUMENTS

BE   1016416      3/2006
DE   3228061   *  2/1983  ............ E03D 13/00
(Continued)

OTHER PUBLICATIONS

"Translation of Schwingkreis", German Institute for Standardization (Din), <https://www.din.de/en/services/din-ternnonline/108614! simple-rest-search?sourceLanguage=de&destinationLanguage=en&category=&guery=schwingkreis> (Year: 2019).*

(Continued)

*Primary Examiner* — David P Angwin
*Assistant Examiner* — Nicholas A Ros
(74) *Attorney, Agent, or Firm* — McDonnell Boehnen Hulbert & Berghoff LLP

(57) ABSTRACT

The sanitary appliance comprising a receptacle provided with a flow surface and further comprising at least one sensor for sensing flow of urine (a physiological solution) located at a distance from the flow surface of the receptacle, characterised in that the sensor comprises a resonance circuit. Urine flow may be identified at the flow surface in that: (1) a first voltage is provided to a resonance circuit to be modified into a second voltage; (2) the second voltage is sensed and (3) the second voltage is compared with a reference value for identification of urine flow. Furthermore a dirt layer with a thickness at the flow surface may be identified.

20 Claims, 8 Drawing Sheets

(58) Field of Classification Search
USPC .................. 251/129.04, 129.06; 4/301–305
See application file for complete search history.

(56) References Cited

U.S. PATENT DOCUMENTS

| | | | | |
|---|---|---|---|---|
| 4,689,499 | A * | 8/1987 | Yee .................... | G01R 19/1659 |
| | | | | 326/62 |
| 5,062,304 | A * | 11/1991 | Van Buskirk ...... | A61B 5/14507 |
| | | | | 4/114.1 |
| 7,456,752 | B2 * | 11/2008 | Oberle ................. | G01N 27/023 |
| | | | | 340/539.26 |
| 8,049,517 | B2 * | 11/2011 | Greenwald ......... | A61M 1/3626 |
| | | | | 324/639 |
| 2010/0125937 | A1 * | 5/2010 | Chen ....................... | E03D 5/105 |
| | | | | 4/305 |
| 2010/0146691 | A1 * | 6/2010 | Chan ...................... | E03D 5/105 |
| | | | | 4/313 |
| 2011/0050432 | A1 * | 3/2011 | MacSween ............ | E03D 13/00 |
| | | | | 340/603 |
| 2011/0199251 | A1 * | 8/2011 | Iwata ...................... | G01S 7/032 |
| | | | | 342/27 |
| 2015/0020298 | A1 * | 1/2015 | Hsu ........................ | E03D 13/00 |
| | | | | 4/305 |

FOREIGN PATENT DOCUMENTS

| | | | | |
|---|---|---|---|---|
| EP | 0783058 | | 7/1997 | |
| EP | 1081299 | | 7/2001 | |
| WO | 2008017314 | | 2/2008 | |
| WO | WO2008017314 | * | 2/2008 | ............ E03D 13/00 |
| WO | 2009092201 | | 7/2009 | |

OTHER PUBLICATIONS

EPO Communication, Office Action for EPO Application No. 13 799 229.3-1005, dated Nov. 7, 2019, 5 pages.

* cited by examiner

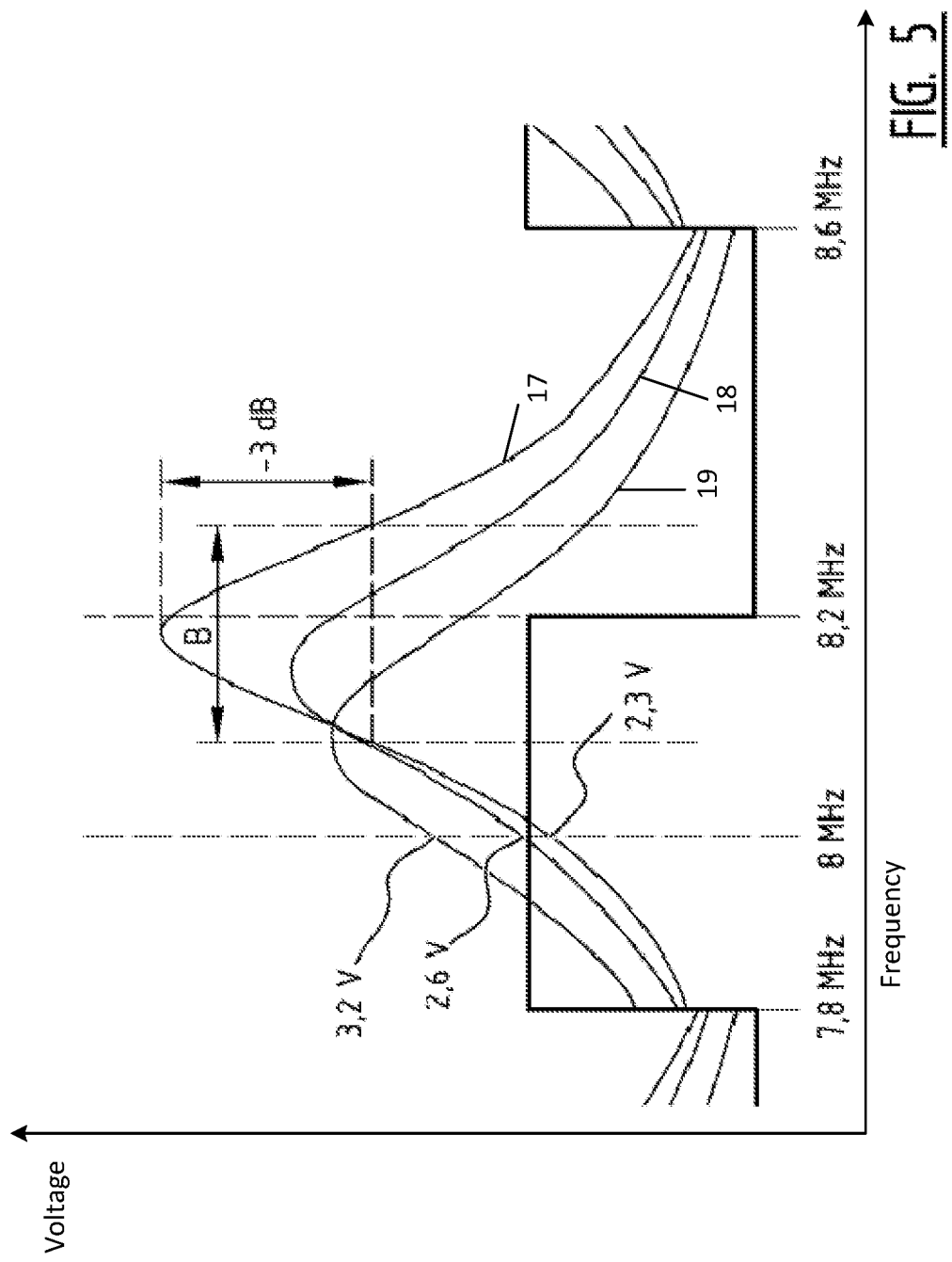

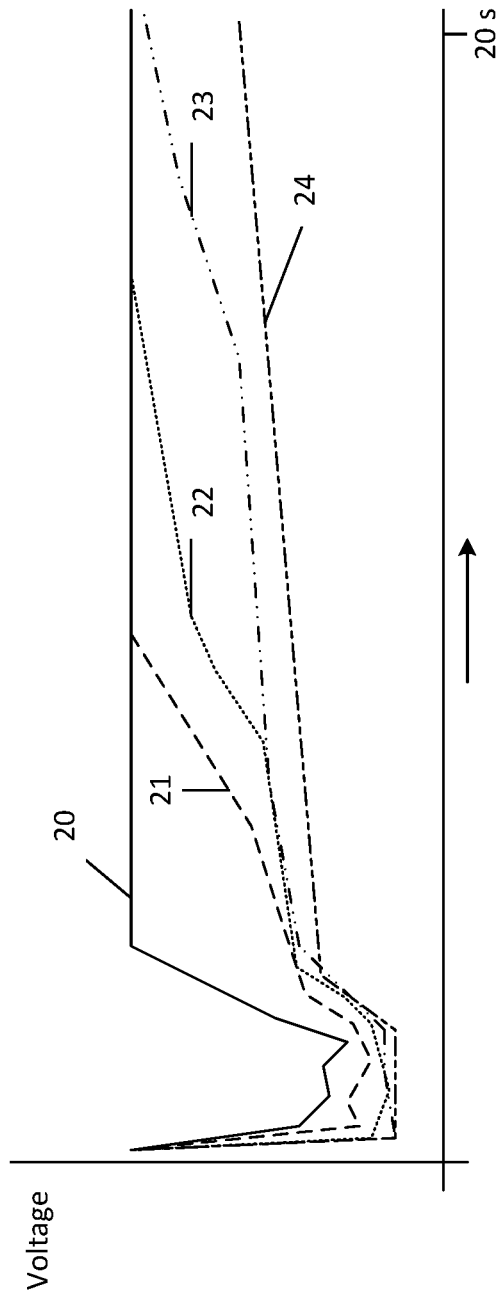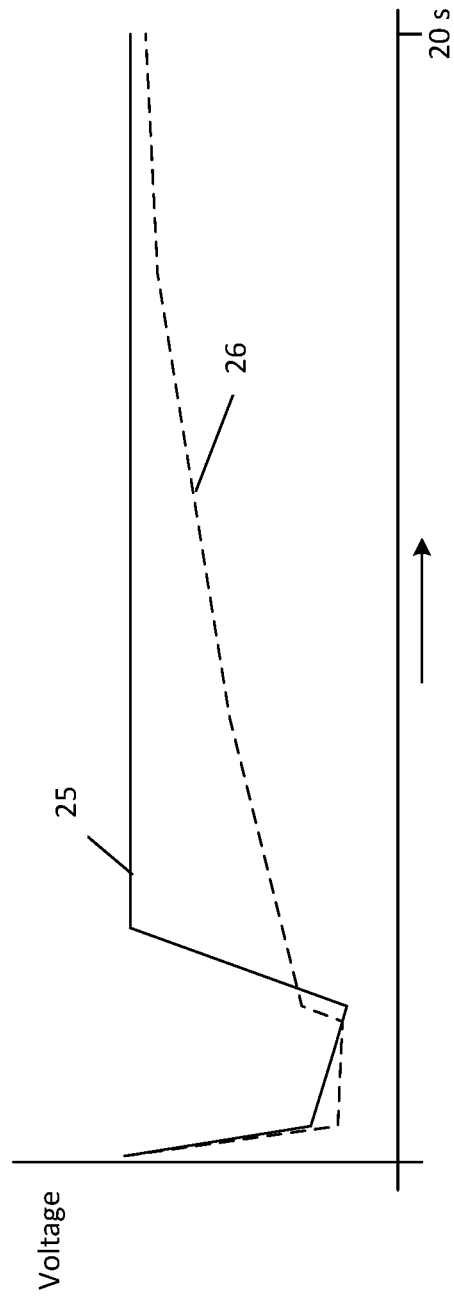

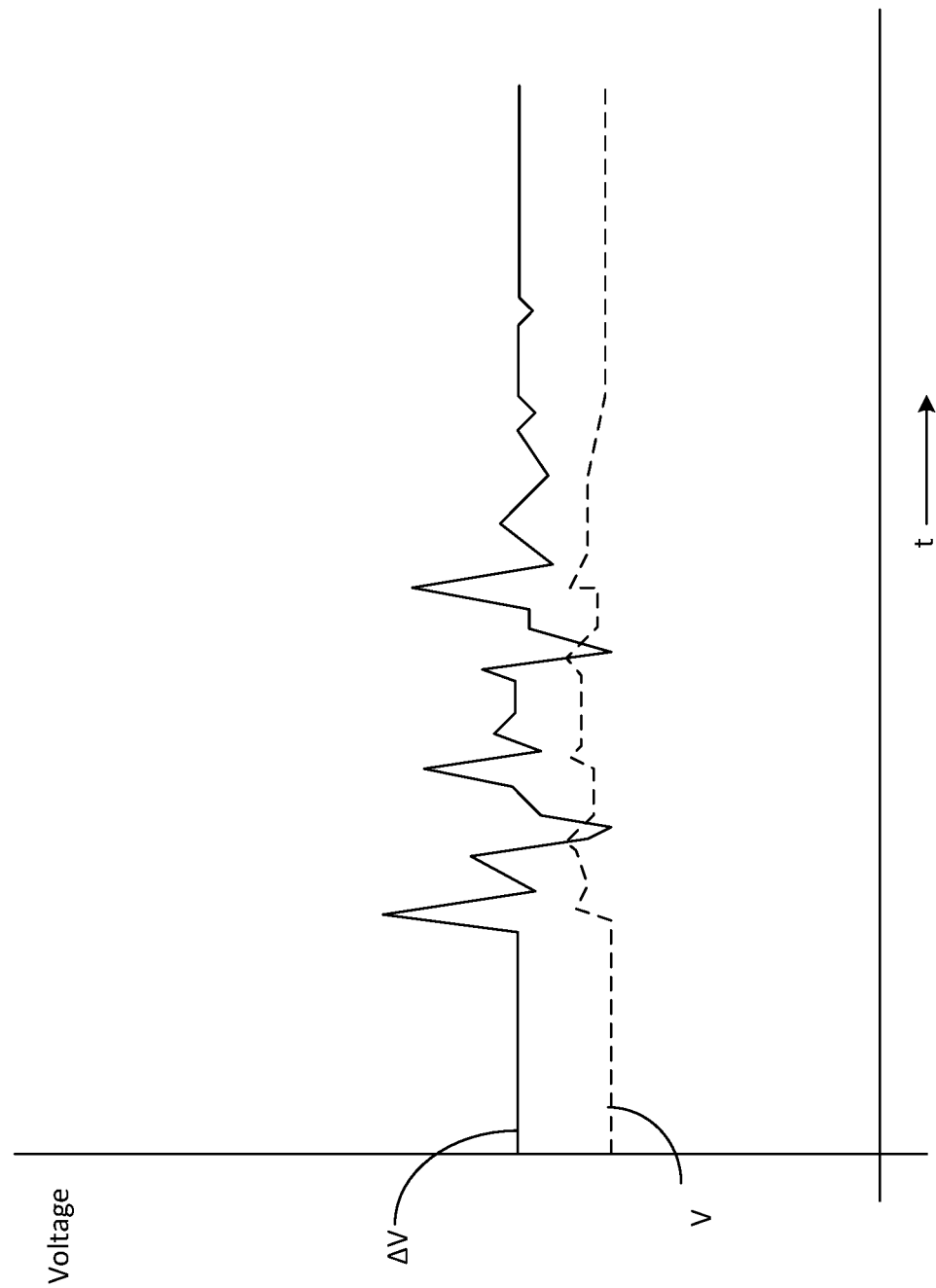

SANITARY APPLIANCE AND METHOD OF DETERMINING USE THEREOF

FIELD OF THE INVENTION

The invention relates to a sanitary appliance comprising a receptacle provided with a flow surface and further comprising at least one sensor for sensing flow of urine (a physiological solution) located at a distance from the flow surface of the receptacle.

The invention also relates to a method of identifying urine flow at a flow surface of a receptacle of a sanitary appliance.

The invention further relates to the use of a sensor for the determination of urine flow in a sanitary appliance.

BACKGROUND OF THE INVENTION

Toilet facilities in locations visited by a large number of people, such as those in motorway service stations, have become a location for advertising. Sanitary appliances provided with one or more sensors may be used for identifying when such advertising should start and when it can be terminated.

One such sanitary appliance is known from BE-1016416A6. This prior art document proposes the use of a capacitive sensor and an electronic circuit for reading the capacitive sensor. The reading circuit transmits a signal to a processor to which also a display is coupled. The display can be used for games, for information on the urine flow and the provision of messages and advertisement.

The capacitive sensor is located on a rear side of the receptacle. Flow of urine in the receptacle at a location approximately opposite to the capacitive sensor may be detected as a change in capacitance.

It has turned out that the capacitive sensor does not meet the requirements. Constituent portions of the urine typically adhere to the flow surface of the receptacle, at least in some areas. This clearly depends on the frequency and the flow of a cleaning liquid, which typically is water. As a result thereof, the capacitance of the appliance in a non-use period (the background capacitance) increases. This complicates a distinction between flow of urine before the sensor (in the typically short period that this occurs) and the background capacitance. It has to be understood, in relation thereto, that the capacitance anyhow includes a component representative of the receptacle itself. The receptacle typically is a body of ceramic, dielectric material. The urine flow thus constitutes only an addition to the background capacitance.

SUMMARY OF THE INVENTION

It is therefore an object of the present invention to provide a sanitary appliance with an improved sensor, and the use thereof.

It is a further object to provide an improved detection method.

According to a first aspect of the invention, a sanitary appliance is provided that comprises a receptacle provided with a flow surface and further comprising at least one sensor for sensing flow of urine (a physiological solution) located at a distance from the flow surface of the receptacle, characterised in that the sensor comprises a resonance circuit.

According to a second aspect of the invention, a method of identifying urine flow at a flow surface of a receptacle of a sanitary appliance is provided, comprising the steps of:

providing a first voltage to a resonance circuit to be modified into a second voltage;
sensing the second voltage;
comparing the second voltage with a reference value for identification of urine flow.

According to a further aspect of the invention, there is provided the use of a sensor comprising a resonance circuit for sensing the flow of urine in the sanitary appliance of the invention, particularly in accordance with the method of the invention.

According to again a further aspect of the invention, a method of detecting a dirt layer with a thickness at a flow surface of an appliance suitable for fluid flow is provided, comprising the steps of:

Providing a first voltage to a resonance circuit to be modified into a second voltage, said resonance circuit being located at a distance from said flow surface;
Sensing the second voltage at a resonance frequency of the resonance circuit in the course of time;
Comparing a time-derivative of the second voltage with a reference value for identification of the dirt layer.

According to a further aspect of the invention, a sensor is provided for sensing a dirt layer with a thickness at a flow surface of an appliance suitable for fluid flow, said sensor being designed for a location at a distance from said flow surface, which sensor comprises a resonance circuit and an input circuit with a switchable capacitor for calibration of the resonance circuit such that a second voltage resulting from application of a first voltage to the resonance circuit will be sensed, at least substantially, at a resonance frequence of the resonance circuit.

According to again a further aspect, a method for cleaning a flow surface of an appliance suitable for fluid flow is provided, comprising the steps of detecting the dirt layer in accordance with the invention, resulting in identification of a dirt layer, and defining a cleaning protocol on the basis of the identified dirt layer.

The invention is based on the insight that the sensitivity of the sensor on variation of capacitance is significantly reduced. Particularly, by sensing in the area of resonance, a relative difference in sensed voltage between air and other media such as urine and water, remains unaltered to a significant extent. As a result, the invention enables not merely identification of urine flow at a specific location of the flow surface, but also enables identification of the dirt layer with a thickness. In the following these major applications will also be referred to as the urine detection mode and the film detection mode. It is however, in a single application, not required that both the urine detection mode and the film detection mode are enabled.

In the urine detection mode, the underlying idea is that a quality factor rather than a capacitance is to be determined. The quality factor is well known in the field of radio electronics as a measure of the ratio of the resonance frequency and the bandwidth (i.e. a 3 dB band). The inventors have understood that any developed dirt layer will have an impact on the resonance frequency, but does normally not lead to a reduction in the quality factor. The quality factor is relatively insensitive to small variations in the capacitance and inductance but decreases as losses increase and can thus be used to identify urine flow at a particular location at the flow surface of the receptacle of the sanitary appliance.

In fact, a thin dirt layer or dirt film tends to cause less losses than urine flow, which should be considered as a relatively thick salty fluid layer. A layer of clean water applied onto a dirt film can also be distinguished from urine flow.

Suitably, thereto, the first voltage is applied with an excitation frequency that is relatively close to the area of resonance. For instance, it is within an area of less than 0.5 MHz difference to the resonance frequency as sensed initially without flow of urine, water or another cleaning liquid. More preferably the excitation frequency is lower than the resonance frequency.

While the quality factor is conceptually the critical parameter, the effective sensing occurs on the basis of the second voltage. This is a signal that can be easily transformed and amplified to obtain a reliable detection. No necessity appears present to calculate the quality factor explicitly.

Most preferably, in the urine detection mode, use is made of a plurality of sensors. This allows a differential sensing. In this situation, the output of a first sensor may be used as a reference value for a second sensor. However, alternatively or additionally, use may be made of a reference value taken from a memory. Such reference value may represent historical situation, for instance of a preceding sensing cycle, but also represent a calibrated value, i.e. a value in a situation of a clean flow surface. It will be understood that a plurality of comparisons with a plurality of reference values could be made. It will be further understood that a related value rather than the second voltage could be used, including a derivative of the second voltage over time, a response time and the like.

If a plurality of sensors is used, it is typically beneficial to sense the sensors sequentially. Such sequential sensing will prevent any cross-talk between neighbouring resonance circuits. Alternatively, the sensors could be sensed with overlapping timing. A simultaneous sensing appears technically possible, for instance in that the different resonance circuits have sufficiently different resonance frequencies, but appears less attractive, particularly in view of additional complexity in relation to the supply of the first voltages.

A most promising application hereof is the provision of a plurality of sensors to be operative as a joystick. Herein the sensor output is coupled to a display or optionally another electronic device. A user, particularly a male user, may then operate the joystick by means of directional pissing. In one implementation hereof, any cross-talk may be used so as to sense orientation and/or intended intensity. However, alternative implementations are not excluded.

The identification of urine flow may be exploited in several manners. First, as mentioned in the prior art, the location of the urine flow across the receptacle may be identified. This could be shown at a display to a user, or it could be used as a signal for driving a display, or it may be exploited in a multimedia applications, wherein a user is stimulated to focus urine at one or more locations in the course of time. Multimedia applications include games, advertisement, messages as well as monitoring information. In a specific embodiment with the embodiment with a plurality of sensors, the location of the urine flow could be used to derive a size of the user, and therewith to specify which of a series of display is to be driven such that the depicted information is at a right height before the user.

Secondly, the one or more sensors in a receptacle may be used for obtaining monitoring information. The quality parameter could be used for counting the number of users. Furthermore, because flow of cleaning liquid will provide another shift in resonance frequency than the urine flow, the urine flow may be distinguished from water flow. It can therewith be identified how often a receptacle is flushed, in comparison to how often it is used.

The monitoring may be expanded so as to tune operation of the sanitary appliance to the effective use, and also to reduce consumption of cleaning liquid, particularly flushing water. In one embodiment, a time is sensed at which the urine flow stops and a user terminates use of the receptacle. This result may be used to define a starting time for flushing. On the basis of historical information of frequency of use, an algorithm may be envisaged so as to optimize flushing. For instance, the flushing time may be set longer if the time lapsed since a previous usage was long. If many users make use of a sanitary appliance one after the other, the flushing time may well be shortened. Alternatively, flushing time may be shortened anyhow, but a flushing may be repeated in the event that a time span lapses before a subsequent user arrives. Furthermore, information on the location of urine flow within a receptacle, as obtained with a plurality of sensors, may be exploited so as to flush the receptacle (primarily) at a certain area of the sanitary appliance, rather than the complete surface area. Thereto, the sanitary appliance would be provided with a plurality of nozzles or the like, which can be opened or closed independently from each other.

In the film detection mode, the resonance is used to obtain a maximum signal and therewith optimum detection of the film. Thereto, the resonance circuit is calibrated so as to allow sensing of the second voltage at a resonance frequency. This resonance frequency is suitably the resonance frequency of the appliance when the flow surface is substantially free of a dirt layer. However, it is not excluded that an alternative reference situation with its own resonance frequency is chosen. In view of the shift in resonance frequency due to development of any dirt layer and/or due to flow of a salt solution, the sensing will likely deviate, if a dirt layer is indeed present. Nevertheless, the tuning of the circuit to the resonance frequency provides optimum results. This is particularly in view thereof, that the variation over time appears most important for thickness determination, and more particularly the time of breaking up of dirt film after each urine flow.

Rather than merely reviewing the derivative of the second voltage and its profile over time for determining the dirt layer, use could be made of a combination of sensing in both modes; the film detection mode is primarily based on the capacitive effects, and the urine detection mode is primarily based on the quality factor. While the capacitance in itself is not a reliable parameter for identifying urine flow, it is suitable to define an amount of dirt; if a capacitance is detected that exceeds a threshold value, while simultaneously no urine flow is sensed, a significant amount of dirt will have been adhered to the flow surface. This holds even more pronouncedly, if urine flow is detected, but no corresponding change in capacitance is found.

Most suitably, the tuning to the resonance frequency is carried out with a switchable capacitor. Such a switchable capacitor is suitably embodied with a field-effect transistor and a capacitor. The transistor is herein suitably controlled by a system controller, for instance a microcontroller that is also responsible for voltage supply to the resonance circuit. This has the advantage that a switch may be made between the urine detection mode and the film detection mode. Rather than a single switchable capacitor a capacitor network could be applied. This is particularly useful where the sensor is to be used for a variety of appliances.

In this manner a state of "clean"-ness may be determined. The resulting information may be exploited for defining advanced cleaning methods. For instance, monitoring is enabled to review whether a specific cleaning operation with soap or other cleaning means successfully cleans the sanitary appliance. Furthermore, monitoring the state of cleanness at a moment intermediate between different usages, may be exploited to do a further cleaning operation, wherein for instance the cleaning liquid is a cleaning solution rather than pure water. In such a case flavors could be added to the cleaning liquid. Thereto, the sanitary appliance would be provided with a separate container for cleaning liquid and/or cleaning liquid concentrate. More generically, the use of cleaning liquid could be optimized to the needs in view of the state of "clean"-ness, so as to minimize water consumption and simultaneously to provide a sanitary appliance that meets the standards of hygiene and the expectations of users.

The film detection mode is not merely useful for detection of a dirt film resulting from urine flow in a receptacle. This film detection mode may alternatively be applied for detection of a dirt film at a flow surface of any other appliance, up to and including pipe systems, alternative household appliances such as in a kitchen, shower, bath, outside water disposal locations. In such a context, the combination with the urine detection mode may also be of help, so as to identify locations wherein fluid flow is obstructed, for instance as a consequence of the dirt layer.

The resonance is particularly obtained by application of the first voltage as an alternating current. In a preferred implementation, the first voltage is provided with a symmetrical rectangular wave. This allows application of the first voltage by means of a digital port of a voltage source, for instance a microcontroller or a demultiplexer.

The input voltage is suitably pretreated for optimization of the first voltage, so as to obtain an optimum output, i.e. a modified second voltage that is as large as feasible in view of the components in use. Particularly, the circuit is implemented so as to have a transformation ratio between the second voltage and the first voltage between 2 and 8, for instance between 2.5 and 5. Components that define a maximum to the second voltage are for instance a rectifier and an operational amplifier. A suitable implementation of the pretreatment of the first voltage is a capacitive impedance transformation, as obtainable with a capacitive transformer circuit.

Furthermore, it is advantageous to add an adjustable capacitor in an input circuit, for fine-tuning the circuit.

In order to obtain a maximum transfer of energy, the input circuit suitably comprises a resistance in series with the voltage source, so as to obtain a—transformed—source impedance that is substantially equal to a total resistance of the resonance circuit. This total resistance is equal to the resistance of any resistor components and the loss resistance. It will be clear to the skilled person that this resistance depends on the circuit topology of the resonance circuit, and how to calculate the representative value. A skilled person will therewith know what resistance to add to the design, so as to obtain a suitable transformed resistance. It is further clear that the added resistance depends on the inherent resistance of the voltage source. Typically, the voltage source has a small resistance, so that the transformed resistance is to be substantially equal to the said total resistance of the resonance circuit. Background hereof is the insight that maximum transfer of energy occurs if the impedance of the source and the load are complex complementary, i.e. the resistive components are equal in magnitude, while the reactive components are equal in magnitude, but opposite).

Preferably, an output circuit is present for transmission of the second voltage to a processor. This output circuit suitably provides an impedance reduction. Such impedance reduction is for instance achieved with a buffer stage of an operational amplifier, in combination with a very large resistance, for instance 1 MΩ or more at the entrance of the operational amplifier to minimize additional loading of the tuned circuit. Suitably, a resistance is provided in series with an output of the said buffer stage, so as to prevent that the final stage of the operational amplifier should deliver high currents, and further attenuating any high-frequency components on a connection to the said processor. The output circuit more preferably also comprises a rectifier, such as a diode.

The processor is suitably a microcontroller. Preferably, the microcontroller at the sensor output is the same as the microcontroller that supplies the voltage to the input circuit. Preferably, in the event that a plurality of sensors is present, the microcontroller is a driver for the plurality of the sensors, such that the sensing of a first sensor is terminated prior to the start of sensing of a second sensor. Such a sequential driving of the sensors is desired for prevention of any cross-talk between the inductors of the resonance circuits.

The sanitary appliance of the present invention may be a urinal aimed at male users. Alternatively, the sanitary appliance may be an ordinary lavatory bowl or a lavatory bowl of the types more regular in for instance France and Japan. The sanitary appliance is typically provided with means for flushing, i.e. for the provision of cleaning liquid such as water. However, the sanitary appliance could alternatively be used for flushless systems, i.e. water-free systems. The sensor is then used, in one embodiment for counting the number of usages, and optionally the frequency thereof. After a predefined amount of usages, an indicator may show that maintenance would be required.

The sanitary appliance may further be provided with an indicator defining a state of clean-ness of the receptacle and/or whether the sanitary appliance is ready for use. The indicator comprises suitable a light source, such as a LED, or any type of display. Alternatively, use could be made of a plurality of LEDs in different colours mimicking a traffic light.

For sake of clarity, it is added that various embodiments and arrangements recited in the dependent claims and hereabove in relation to one aspect of the invention may also be applied in combination with alternative aspects. For instance, implementations of the sensor circuit as recited in relation to the sanitary appliance may also be beneficial for the sensor circuit for the film detection means,

BRIEF INTRODUCTION OF THE FIGURES

These and other aspects of the invention will be further elucidated with reference to the figures, that are diagrammatical in nature and wherein:

FIG. 5 is a graph with curves measured on an oscilloscope in a test with the sensor circuit as shown in FIG. 4

FIGS. 6 and 7 are graphs of the variation of the output voltage (i.e. second voltage) as a function of time after successive urine flows, when operating the sensor in the film detection mode;

Figure 10:
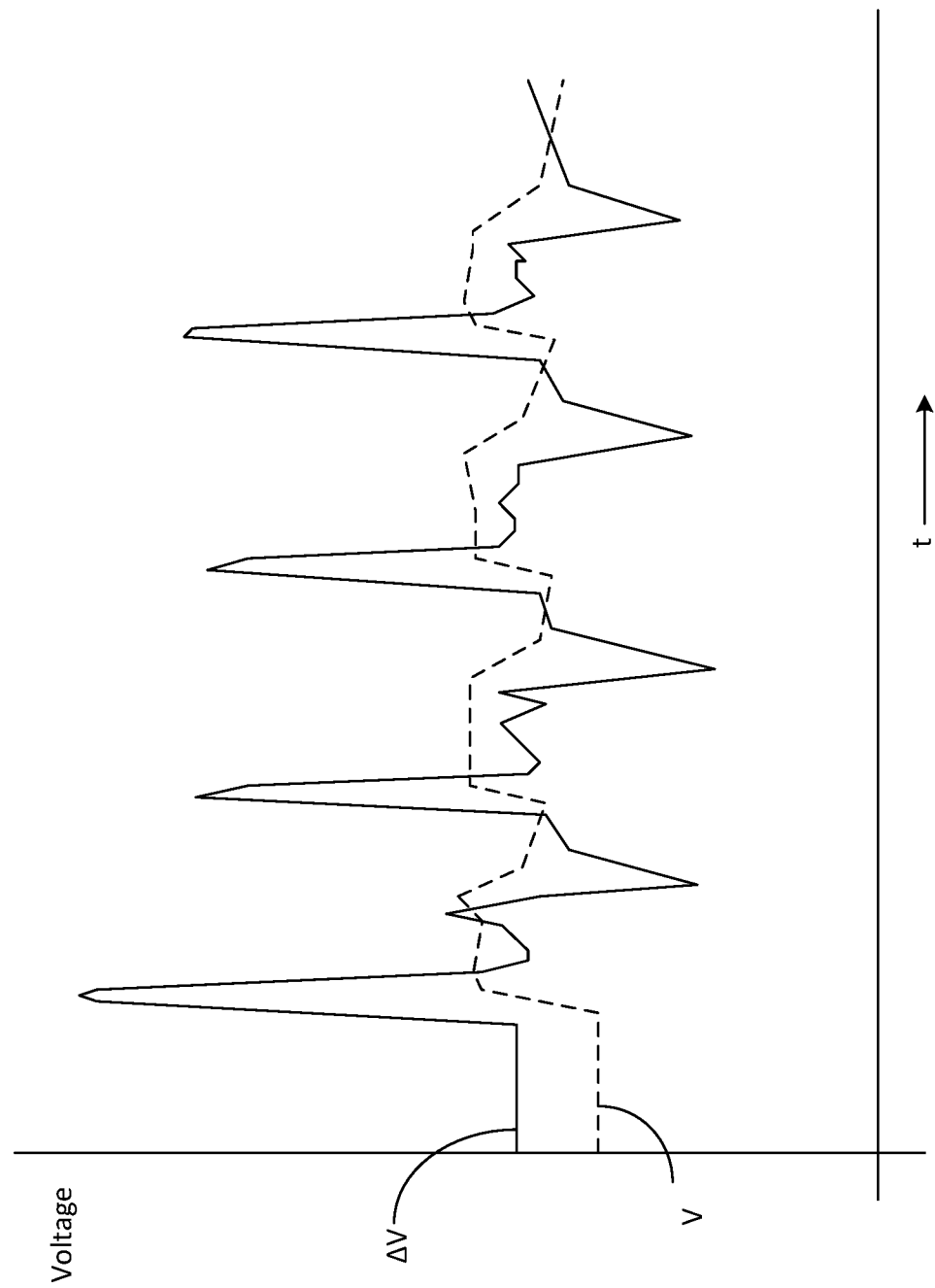

FIG. 10 is a graph of the variation of the second, output voltage and its derivative as a function of time upon successive applications of urine, when operating the sensor in the urine detection mode; and FIG. 11 is a graph of the variation of the output voltage and its derivative as a function of time upon successive applications of tap water, when operating the sensor in the urine detection mode.

DETAILED DESCRIPTION OF ILLUSTRATIVE EMBODIMENTS

The figures are not drawn to scale. Equal reference numerals in different figures refer to equal or corresponding parts.

Figure 1:
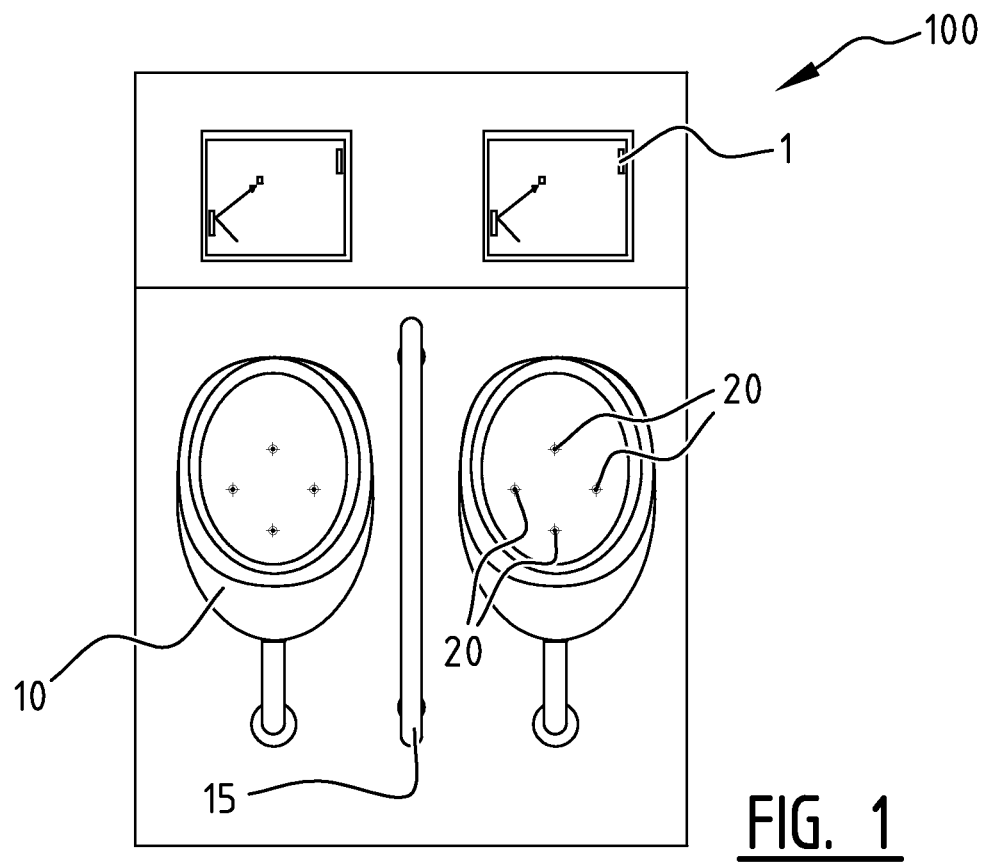
FIG. 1 shows a front view of an arrangement with two urinals.

FIG. 1 shows a diagrammatical front view of a sanitary appliance 100 comprising a receptacle 10. The sanitary appliance 100 is further provided with sensors 20, and with a display 1. Actually, FIG. 1 shows two receptacles 10 with two displays 1 separated by a separation wall. For sake of simplicity, the complete arrangement is referred to as the sanitary appliance 100. However, it will be understood that typically a sanitary appliance comprises one receptacle.

Figure 2:
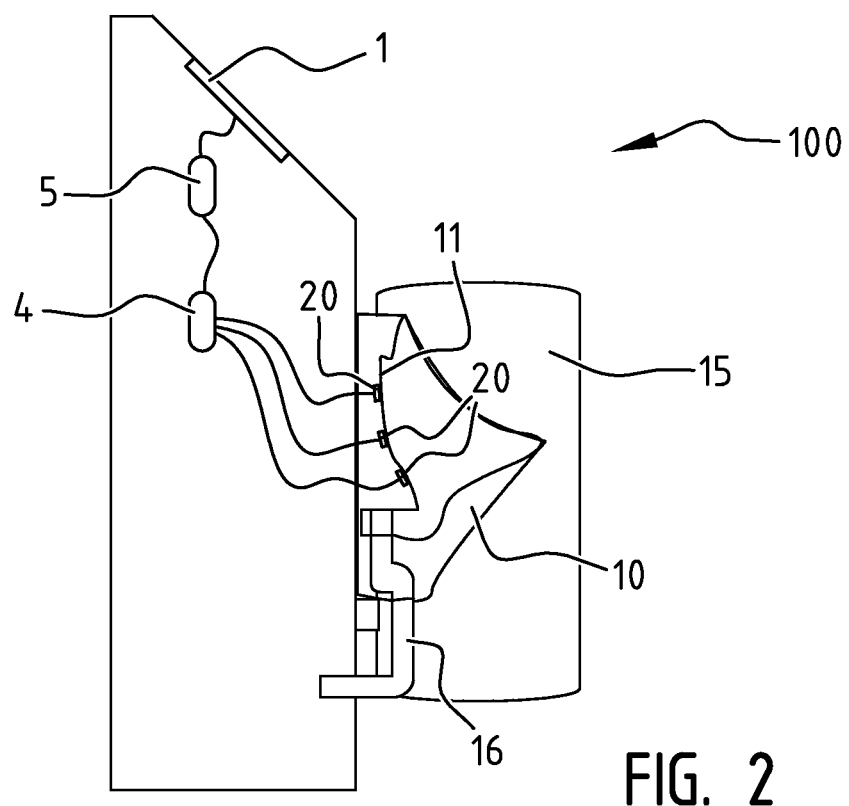
FIG. 2 shows a diagrammatical cross-sectional view of the arrangement of FIG. 1.

FIG. 2 shows in a diagrammatical, cross-sectional view the sanitary appliance as shown in FIG. 1. The receptacle 10 is provided with a flow surface 11, and with a removal pipe 16. The sensors 20 are located at a distance of the flow surface 11. In this example, the sensors 20 are located at a rear side of the receptacle 10. Alternatively, the sensors 20 may be located in a cavity in the receptacle 10, more precisely in a cavity in the body thereof, which is accessible from the rear side. The sensors 20 may even be integrated into the receptacle's body, though this limits accessibility and may therefore be disadvantageous. For sake of clarity, the term 'rear side' as used herein, is used in a functional sense as the side of the receptacle at which no urine flow occurs. The exact location is open to further design, also dependent on the receptacle's shape, and could for instance be below, behind or sidewise of the flow surface. FIG. 1 shows four sensors per receptacle. This is merely an example. One sensor suffices in a basic embodiment of the invention. In an embodiment for sensing urine flow and/or a state of clean-ness at specific locations, the number of sensors is for instance from 2 to 10, while 3-6 appears a good engineering solution of appropriate sensing and acceptable cost level. The locations are evidently open to design. For instance, for a conventional toilet bowl, one or more sensors could be located behind a ring from which cleaning liquid is disposed. In an embodiment focusing on multimedia and advertisement, however, alternative locations will be preferred.

Attachment of the sensor 20 to the receptacle 10 can be achieved in various ways, such as with labels, screws or other mechanical connection means as known in the art. The provision of the sensor in a cavity is considered to be advantageous for the present sensor for several reasons. First, the resonance circuit generally comprising an inductor and a capacitor is typically provided on a substrate. The dimensions of the substrate are sufficient so as to fit in a cavity of a size feasible with conventional fabrication technology of receptacles. Secondly, the provision of the sensor in a cavity may be implemented in combination with a locally thinned thickness of the constituent body of the receptacle 10. Such reduction of the thickness contributes to a good sensing. Thirdly, a cavity allows for standardization (i.e. prescription) of the exact location of the sensor. Fourth, clamping means may be easily implemented in a cavity. Such clamping means are desired so as to prevent that air layers of varying thickness are present between the sensor and the receptacle. Such an air layer may easily disturb the sensing. Fifth, a cavity appears to be a proper protection for the sensor during installation of a sanitary appliance. The cavity may be a virtually closed cavity, with merely a narrow aperture on one or two sides. Alternatively, the cavity may be an open cavity, i.e. a portion of the rear side's surface that is retracted so as to form a well-defined valley. Anything between such virtually closed and open cavity is also feasible. While the clamping is suitably combined with a cavity arrangement, the clamping may be implemented also in combination with other location arrangements for the sensor.

As shown in FIG. 2, the sensor 20 is suitably coupled to an electronic circuit 4, which is again coupled to a processor unit 5 for driving a display 1. It appears suitable that the electronic circuit 4, which may comprise an input circuit and an output circuit, is implemented on said substrate as well. This appears suitable for an appropriate signal transmission to the processor unit 5. Such a connection to the processor unit 5 could be a wireless connection. However, a conventional cable connection over a bus, such as a I2C bus, is deemed more robust in the context of sanitary appliances. The cable connection may well be integrated into the body of the receptacle, for instance within dedicated channels therein.

Alternatively, cable connection and processor unit 5 may be located outside of the receptacle 10, for instance in a separate box.

Figure 3:
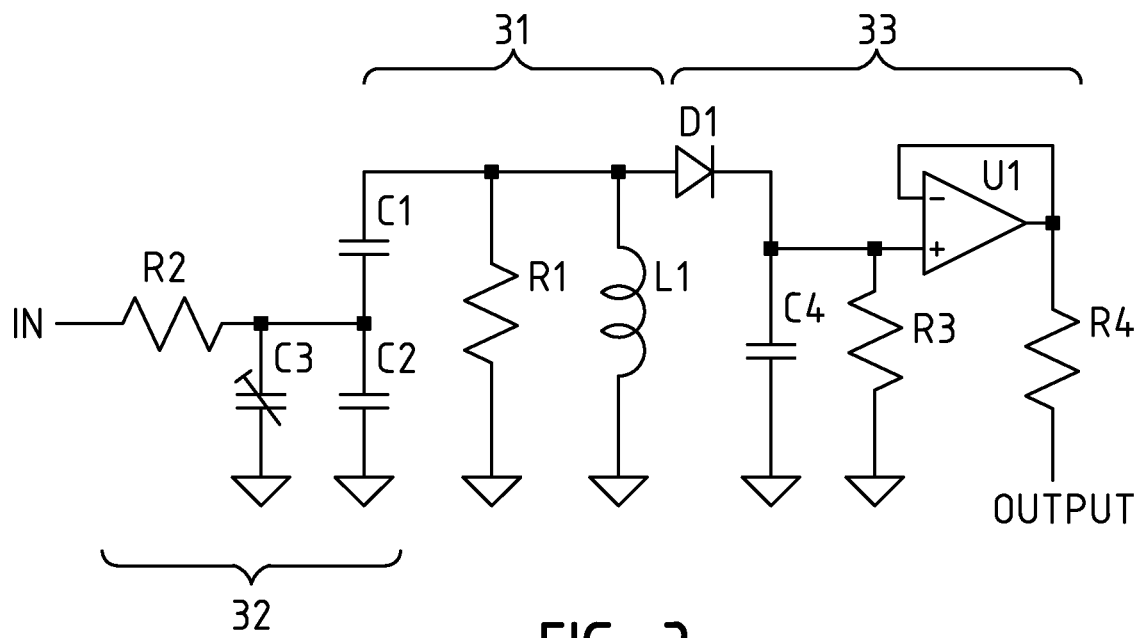
FIG. 3 shows a circuit diagram of the sensor in one embodiment.

FIG. 3 shows a circuit diagram for a first embodiment of the sensor circuit 20. The sensor circuit comprises a resonance circuit 31, an input circuit 32 and an output circuit 33. The input circuit herein applies a pretreatment to an input voltage. Suitably, this input voltage originates from a microcontroller, so as to minimize use of components. However, a separate driver and/or a demultiplexer may be used if so desired. More preferably, the input voltage originates from a digital port of the microcontroller and is a symmetrical rectangular wave. In one example, the input voltage is a 5V supply voltage, having an amplitude of 2.5 V.

Several functions are implemented in the input circuit 32; first, an impedance correction is applied, so that the resistive component of the driving source plus input circuit is substantially equal to the resistive component of the resonance circuit 31 after impedance transformation. This impedance correction is herein embodied with resistor R2. In a suitable embodiment of the resonance circuit 31, the (loss) resistance R1 will be preferably larger than 50 k$\Omega$. A second function is a capacitive impedance transformation. This is achieved with the capacitors C3 and C2. Because of the resistor R2, the peak voltage on the crossing C1/C2+C3 would be 1.25 V, at an input voltage of 5V, in case of a sinusoidal voltage shape. As the amplitude of the first harmonic (this fundamental frequency is filtered by the tuned circuit) of a symmetrical rectangular wave is $4/\pi$ times larger, a peak voltage of 1.6 V is achieved at said crossing. This peak voltage is also referred to as the first voltage.

A third function is that the capacitor C3 is an adjustable capacitor. The value can be trimmed to calibrate the circuit.

The exact implementation of the capacitors follows on the basis of boundary conditions of the output circuit 33 and the definition of the resonance circuit 31. Particularly, the rectifier (implemented as a diode D1) has a maximum voltage drop, for instance 0.6V and the operational amplifier U1 has a maximum common-mode voltage at its input, for instance in the range of 4-5V with a 5V supply voltage. As a result hereof, a transformation ratio may be determined between second voltage (i.e. voltage to the diode D1) and first voltage is for instance between 2 and 5, such as 3. Then, C2+C3=2*C1.

The resonance circuit 31 is suitably defined for a resonance frequency in the range of 3-12 MHz, more preferably between 6 and 9 MHz. Such a resonance frequency is suitable, in that the excitation frequency applied with the first voltage may then be derived from the microcontroller without much transformation. Most suitably, use is made of one of the standard frequencies of a microcontroller. Moreover, use of a resonance frequency in the MHz range is suitable in terms of the penetration power, so as to reach through the receptacle's body, while it may be provided at relatively low voltages and currents, which are acceptable from safety and health perspectives.

The resonance frequency is preferably higher than the excitation frequency in the urine detection mode. More particularly, the difference between resonance frequency and excitation frequency is such that the excitation frequency corresponds to an increasing voltage so as to reach the maximum at the resonance frequency. A difference of at most 0.5 MHz, or at most 5% relative to the resonance frequency appears appropriate. Suitably, the difference is even smaller, for instance between 0.1 and 0.3 MHz, and even more suitably outside a −3 dB range around the resonance frequency. The values for R1, L1 and C1 may then be calculated. L1 is for instance between 5 and 10 H. C1 is for instance between 30-80 pF. The loss resistance R1 is then preferably larger than 50 kΩ. This is further dependent on the exact implementation.

The output circuit 33 comprises several components for optimizing the signal so as to prepare a transmission to the processor, which may well be the microcontroller. A very large input resistance R3 is provided, for instance of at least 1 MΩ, such as 3 MΩ, so as to ensure a high input impedance for the amplifier U1 with a negligible loading of the tuned circuit. This U1 is more particularly a buffer stage which buffers the voltage over the resistance R3 to a low impedance for the subsequent connection. The resistance R4 ensures that a final stage of the operational amplifier should not provide high currents. This resistance R4 additionally attenuates the RF component of the excitation frequency on the connection. The diode D1 is used as a rectifier and the capacitor C2 flattens the second voltage.

Figure 4:
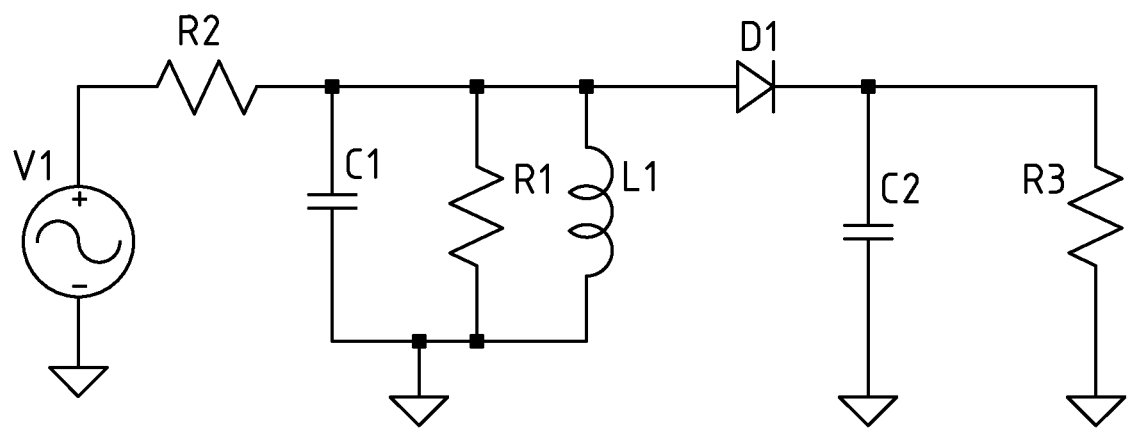
FIG. 4 shows a circuit diagram of the sensor as used in a test

FIG. 4 shows the circuit diagram of a corresponding circuit, which was used for testing purposes. The output circuit 33 is herein not optimized for transmission to a processor over a cable or printed connection, but for supply to an oscilloscope. R3 is herein the input impedance of the oscilloscope with a 10× attenuator, which is conventionally 10 MΩ. The input circuit 32 was limited to a resistor R2~R1 in view of the use of a sinusoidal voltage source acting. This was a so called function generator providing a voltage sweep from 7.8 to 8.6 MHz. Furthermore, a driving signal was provided as a trigger signal for the oscilloscope during the repeated supply of this voltage sweep.

FIG. 5 shows the results in the form of a several graphs on an oscilloscope screen. The block shaped line being either high (from 7.8 to 8.2 MHz) or low (from 8.2 to 8.6 MHz) represents the said trigger signal. Three curves 17, 18, 19 are shown. Curve 17 shows the result in the event that no fluid flows at the flow surface. Curve 18 shows the result in the event that the fluid flow is tap water. Curve 19 shows the result in the event that a physiological salt solution flows at the flow surface. The physiological salt solution was a solution of 9 g NaCl per litre of water and represents urine. The flow surface was a polycarbonate plate. The sensor was attached to the rear side of this polycarbonate plate.

The resonance frequency of curve 17 was 8.18 MHz. The area B is a distance in frequency between the points at −3 dB of the maximum signal at the resonance frequency. B was herein approximately 220 KHz. This corresponds to a quality factor of around 37. The voltage at the excitation frequency of 8 MHz was 2.3 V. This corresponds to half of the maximum amplitude.

The resonance frequency of curve 18 was 8.14 MHz. The quality factor is 32.5. The voltage amplitude at the excitation frequency of 8 MHz is 2.6V.

The resonance frequency of curve 19 was 8.08 MHz. The quality factor is 31. The voltage amplitude at the excitation frequency of 8 MHz is 3.2 V.

Measurements with urine rather than the physiological salt solution have shown that a film remaining on the flow surface of the receptacle after repeated use of a urinal leads to a shift in resonance frequency, due to the increase in capacitance. However, the Q-factor is nevertheless higher, than what would be expected on the basis of the shift in resonance frequency. This is understood to be due to the relative thicknesses of films resulting from urine flow and from salt solution flow. The thin film of urine residue causes less loss than a relatively thick layer of a salt solution.

It may be concluded from this test example that a clear distinction can be made between tap water and a physiological salt solution. Moreover, the relative difference in measured voltage remains relatively constant (unaffected), such that the sensitivity of the sensor will not change significantly in case of variation of the value of the capacitance and/or the inductance. Moreover, the measured voltages are sufficiently large to provide directly to an A/D converter of a microcontroller, in combination with an output circuit as discussed above.

Figure 8:
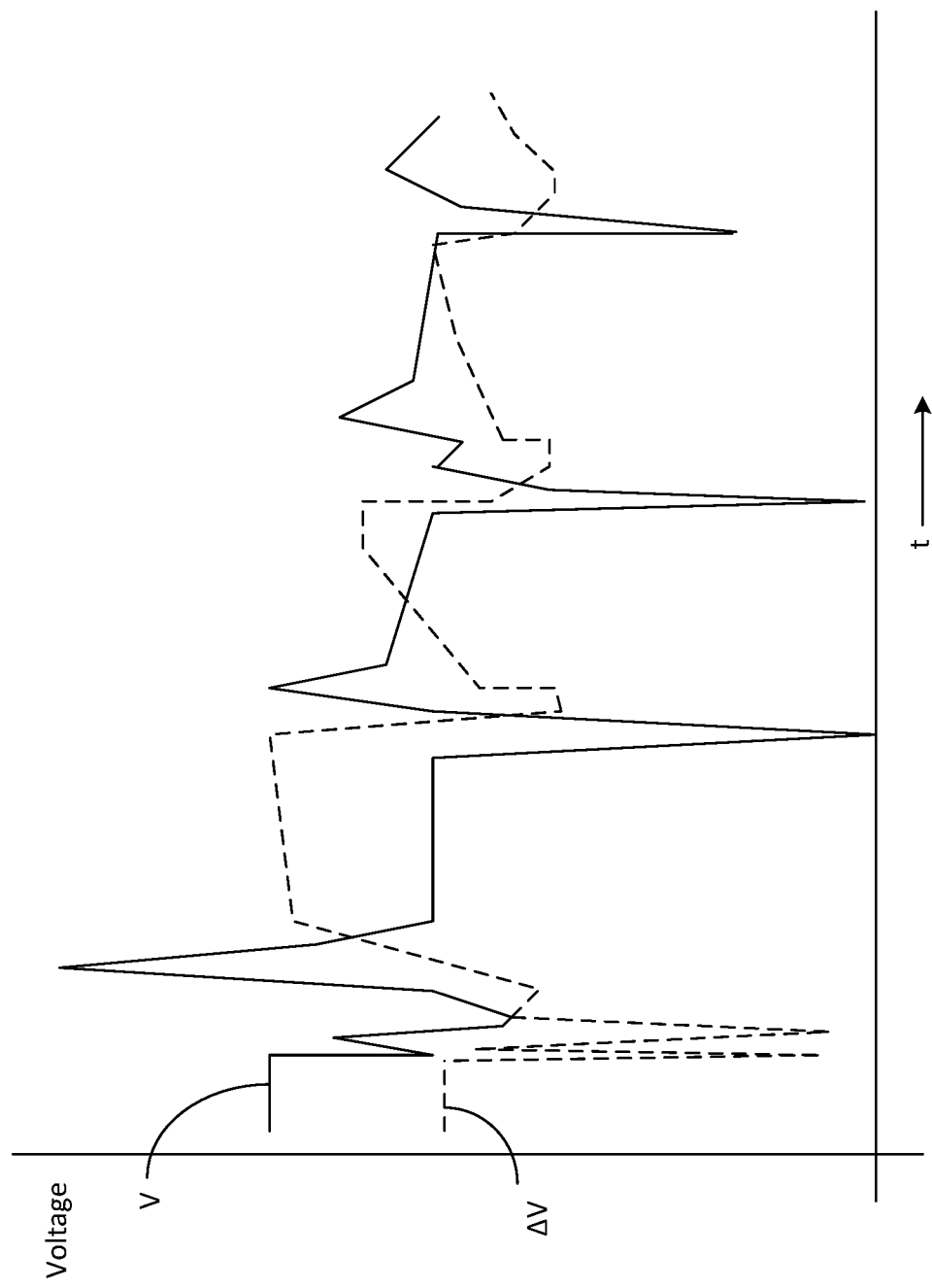
FIG. 8 is a graph of the variation of the second, output voltage and its derivative as a function of time upon successive applications of urine, when operating the sensor in the film detection mode.

FIG. 6-8 are graphs which illustrate and explain the operation in the film detection mode of the sensor. Herein, the operating frequency has been tuned to be substantially identical to the resonance frequency of the receptacle with a clean and suitably dry surface. Any dirt film and urine flow has a significant effect on the second voltage: as a consequence thereof, the amplitude decreases, and the resonance frequency shifts to particularly lower frequencies. The sensed second voltage decreases as a consequence of both. However, in case of urine flow, the second voltage will return to its initial value corresponding to the situation with a clean surface.

FIGS. 6 and 7 are graphs of a further experiment with urine flow. FIG. 6 shows herein the change of the second voltage (i.e. the output voltage) in the course of time for repeated urine flow on the flow surface of a receptacle. Curve 20 is obtained with a clean flow surface. Curve 21 shows the result after 10-fold usage. Curves 22, 23 and show the results after 15-fold, 20-fold and 25-fold use. The curves show that the sensed capacity increases with film thickness in the film detection mode. It furthermore takes longer before the initial value is obtained again. This is due to the development of a layer of dirt of increasing thickness on the flow surface.

FIG. 7 shows two curves. Curve 25 corresponds to curve in FIG. 6. Curve 26 was measured after providing tap water to the flow surface of the receptacle that was used 25 times. It is thus representative of a situation after flushing. It is apparent here from that the sensed capacity gradually returns to the initial value. The curve lies more or less between those for 10-15 times usage. However, the initial lowering corresponds again to the value as initially measured. In FIG. 6, the curves 21-24 have a lower minimum than curve 20. Also the shape of the curve 26 is different from that of curves 21-24. This result demonstrates that a distinction may be made between different situations at the flow surface of a receptacle.

FIG. 8 is a graph showing results of an experiment with urine in the film detection mode. This graph includes a curve for the second voltage as a function of time, and a curve for the time derivative of the second voltage as a function of time. The result indicates four consecutive sensing cycles in which urine flow occurred and thereafter a sensing was done, without intermediate flow of cleaning liquid, i.e. an aqueous solution or simply tap water. The return of the second voltage after application of the first voltage is increasingly slow: the amplitude of the derivative decreases. The rise time of the output voltage while returning back to its initial value (but also the time-derivative), is a measure for the thickness of the urine residue film. Upon comparison with FIG. 9 and further, it becomes apparent that the voltage difference in FIG. 8 is larger. This is due to the operation of the resonance circuit, in the film detection mode, at the resonance frequency for the state in which the flow surface is clean.

Figure 9:
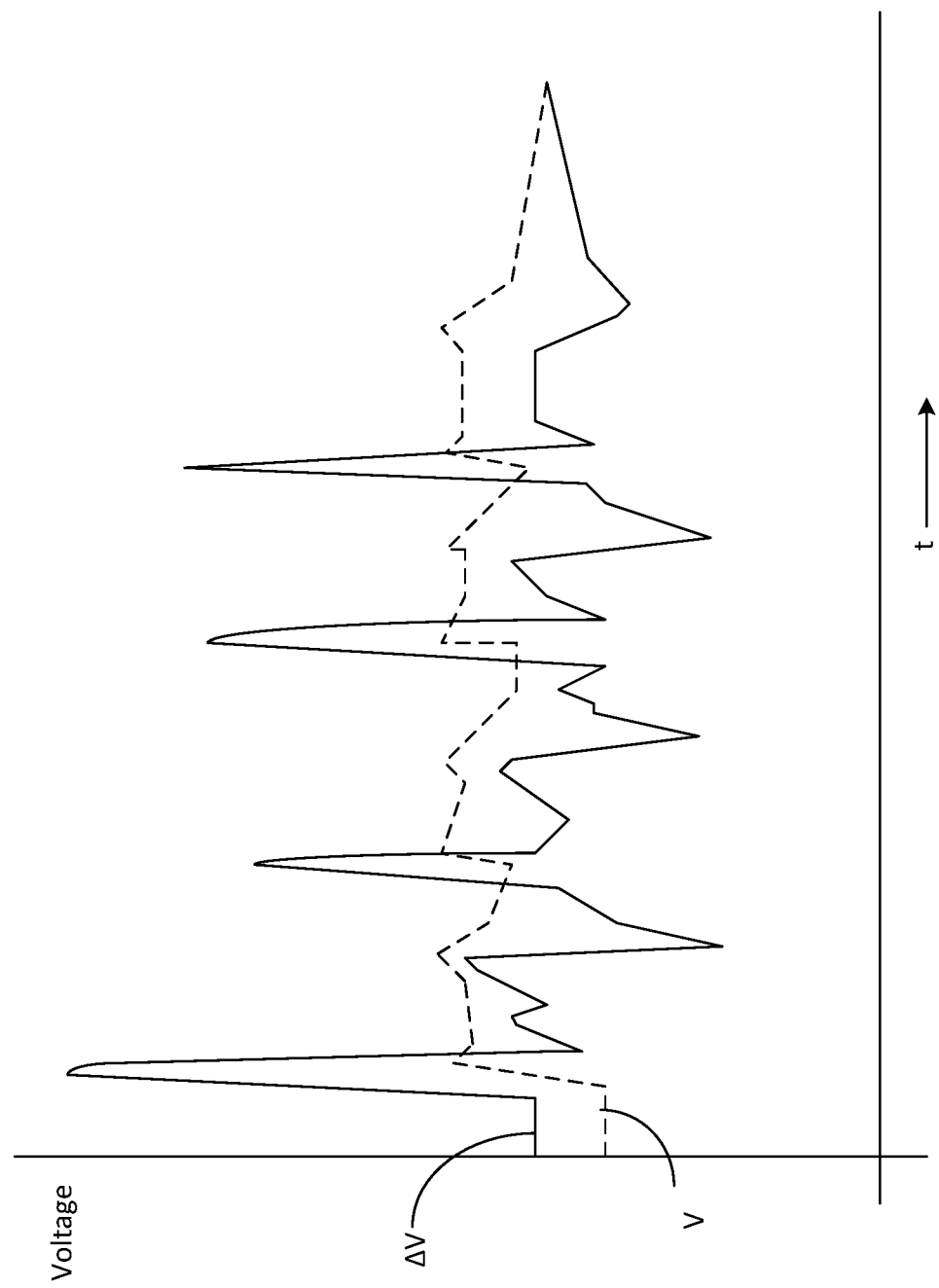
FIG. 9 is a graph of the variation of the second, output voltage and its derivative as a function of time upon successive applications of a physiological solution, when operating the sensor in the urine detection mode.

FIG. 9-11 are graphs of various experiments in the urine detection mode. Each graph includes a curve showing the second voltage as a function of time, and a curve showing the time-derivative of the second voltage as a function of time. In the shown implementation of the urine detection mode, the operation or excitation frequency is lower than the resonance frequency. This results therein that the second voltage is higher during urine flow than for a clean and dry flow surface. The urine detection mode is shown here to operate for a single sensor.

FIG. 9 shows experiments with a physiological solution in the urine detection mode. Each flow of the solution results in a distinctive change of the sensor signal and its derivative.

FIG. 10 shows experiments with urine in the urine detection mode. Each flow of the results in a distinctive change of the sensor signal and its derivative.

FIG. 11 shows experiments with tap water in the urine detection mode. It is clear that the output voltage and its derivative are substantially smaller than is the case in FIG. 9 (physiological solution). It is to be noted upon comparison of FIGS. 9, 10 and 11 that the sensor signal (the second voltage) is highly similar in situations of a physiological solution and urine. Contrarily, thee signal and its derivative are markedly lower with tap water. This enables the software in the microcontroller to differentiate between clean water and solutions with a physiological salt content.

It is observed for clarity and completeness, that a start of urination may be calculated, on the basis of the sensing in the urine detection mode, by means of a time-derivative of the second voltage.

The invention claimed is:

1. A sensor, comprising:
an input circuit configured to drive a first voltage at an excitation frequency;
a resonance circuit configured to receive the first voltage and responsively output a second voltage, wherein:
the resonance circuit is associated with a resonance frequency,
the resonance frequency is based on a flow of urine on the sensor, and
the second voltage changes based on (i) changes to the first voltage and (ii) the resonance frequency; and
a controller configured to:
cause the input circuit to change the excitation frequency and thereby change the second voltage in accordance with the resonance frequency,
determine the resonance frequency based on the change to the second voltage, and
detect the flow of urine on the sensor based on determining the resonance frequency of the resonance circuit.

2. The sensor of claim 1, wherein:
the resonance frequency relates to a quality factor of the resonance circuit;
the second voltage corresponds to the quality factor; and
detecting the flow of urine on the sensor based on determining the resonance frequency of the resonance circuit comprises:
determining the quality factor based on the change to the second voltage, and
detecting the flow of urine on the sensor based on determining the quality factor.

3. The sensor of claim 1, wherein detecting the flow of urine on the sensor is based on comparing the second voltage to a reference value.

4. The sensor of claim 3, wherein:
the sensor is a first sensor of a plurality of sensors;
the sensors of the plurality of sensors are driven sequentially;
the reference value corresponds to an output received from a second sensor of the plurality of sensors; and
detecting the flow of urine comprises determining the resonance frequency based on a difference between the second voltage and the output received from the second sensor.

5. The sensor of claim 3, further comprising a memory, wherein:
the memory stores the reference value;
the reference value corresponds to an output of the resonance circuit calibrated using a dry flow surface; and
detecting the flow of urine comprises detecting the flow of urine based on the second voltage being different from the reference value.

6. The sensor of claim 1, further comprising a switchable capacitor, wherein the controller is further configured to change an operation mode of the sensor from a urine detection mode to a film detection mode by using the switchable capacitor to adjust the resonance frequency of the resonance circuit from a first resonance frequency to a second resonance frequency.

7. The sensor of claim 6, wherein the controller is further configured, in the film detection mode, to detect a dirt layer based on comparing a time-derivative of the second voltage with a reference value for identification of the dirt layer.

8. The sensor of claim 1, wherein causing the input circuit to change the excitation frequency and thereby change the second voltage in accordance with the resonance frequency comprises:

causing the input circuit to sweep the excitation frequency through a range of frequencies over time, and wherein the second voltage changes in accordance with (i) sweeping through the range of frequencies, and (ii) the resonance frequency.

9. The sensor of claim 8, wherein:

the second voltage varies as a function of time in accordance with a first curve associated with the flow of urine on the sensor;

a second curve is associated with voltages output by the resonance circuit for a dry flow surface; and detecting the flow of urine on the sensor based on determining the resonance frequency of the resonance circuit comprises comparing at least one value from the first curve to at least one value from the second curve.

10. A method comprising:

driving, by an input circuit, a first voltage at an excitation frequency;

receiving, by a resonance circuit, the first voltage;

responsive to receiving the first voltage, outputting, by the resonance circuit, a second voltage, wherein:
the resonance circuit is associated with a resonance frequency,
the resonance frequency is based on a flow of urine, and
the second voltage changes based on (i) changes to the first voltage and (ii) the resonance frequency;

causing, by a controller, the input circuit to change the excitation frequency and thereby change the second voltage in accordance with the resonance frequency;

determining, by the controller, the resonance frequency based on the change to the second voltage; and detecting, by the controller, the flow of urine based on determining the resonance frequency of the resonance circuit.

11. The method of claim 10, wherein:

the resonance frequency relates to a quality factor of the resonance circuit;

the second voltage corresponds to the quality factor; and detecting the flow of urine based on determining the resonance frequency of the resonance circuit comprises:
determining the quality factor based on the change to the second voltage, and
detecting the flow of urine based on determining the quality factor.

12. The method of claim 10, wherein detecting the flow of urine comprises detecting the flow of urine based on comparing the second voltage to a reference value.

13. The method of claim 12, further comprising:

sequentially driving, by the controller, a plurality of sensors, wherein:
the input circuit, the resonance circuit, and the controller correspond to a first sensor of the plurality of sensors,
the reference value corresponds to an output received from a second sensor of the plurality of sensors; and
detecting the flow of urine comprises determining the resonance frequency based on a difference between the second voltage and the output received from the second sensor.

14. The method of claim 12, wherein:

the reference value corresponds to an output of the resonance circuit calibrated using a dry flow surface, and detecting the flow of urine comprises detecting the flow of urine based on the second voltage being different from the reference value.

15. The method of claim 10, wherein the input circuit, the resonance circuit, and the controller correspond to a first sensor of a plurality of sensors, the method further comprising:

changing, by the controller, an operation mode of the sensor from a urine detection mode to a film detection mode by using a switchable capacitor to adjust the resonance frequency of the resonance circuit from a first resonance frequency to a second resonance frequency.

16. The method of claim 15, further comprising, in the film detection mode, detecting a dirt layer based on comparing a time-derivative of the second voltage with a reference value for identification of the dirt layer.

17. The method of claim 10, wherein:

causing the input circuit to change the excitation frequency and thereby change the second voltage in accordance with the resonance frequency comprises causing the input circuit to sweep the excitation frequency through a range of frequencies over time, and the second voltage changes in accordance with (i) sweeping through the range of frequencies, and (ii) the resonance frequency.

18. The method of claim 17, wherein:

the second voltage varies as a function of time in accordance with a first curve associated with the flow of urine;

a second curve is associated with voltages output by the resonance circuit for a dry flow surface; and detecting the flow of urine based on determining the resonance frequency of the resonance circuit comprises comparing at least one value from the first curve to at least one value from the second curve.

19. A system comprising:

a plurality of sensors, each sensor of the plurality of sensors comprising:
an input circuit configured to drive a first voltage at an excitation frequency; and
a resonance circuit configured to receive the first voltage and responsively output a second voltage, wherein:
the resonance circuit is associated with a resonance frequency,
the resonance frequency is based on a flow of urine on the sensor, and
the second voltage changes based on (i) changes to the first voltage and (ii) the resonance frequency; and a controller configured to, for each sensor of the plurality of sensors:
cause the input circuit to change the excitation frequency and thereby change the second voltage in accordance with the resonance frequency,
determine the resonance frequency based on the change to the second voltage, and
detect the flow of urine on the sensor based on determining the resonance frequency of the resonance circuit.

20. The system of claim 19, wherein the controller is configured to:

drive the plurality of sensors over time in a sequence, wherein, for each sensor:
detecting the flow of urine on the sensor comprises comparing the second voltage to a reference value, wherein the reference value corresponds to an output of a previous sensor in the sequence.

* * * * *